3,467,686
PREPARATION OF ORGANOSILICON-NITROGEN COMPOUNDS
Charles Edward Creamer, Ridgefield, Conn., assignor to Union Carbide Corporation, a corporation of New York
No Drawing. Filed Oct. 3, 1967, Ser. No. 672,445
Int. Cl. C08g *31/30;* C07f *7/02*
U.S. Cl. 260—448.2                                18 Claims

ABSTRACT OF THE DISCLOSURE

A process for producing organosilicon-nitrogen compounds which comprises contacting an organohalogensilicon compound with a nitrogen base compound at a temperature of at least 50° C. in the presence of a metal selected from the group consisting of magnesium, calcium and zinc, at a contact rate not greater than the reaction of the metal with the hydrogen halide and nitrogen-base hydrohalide salt by-products, where in the mole amount of metal present and the mole amount of nitrogen-base compound employed are about stoichiometrically equivalent to the number of silicon-halogen bonds to be reacted and a separation step which comprises contacting the solid metal halide by-product with a sufficient amount of nitrogen-base compound to form a complex of metal halide and nitrogen-base and liquifying said complex so as to form an immiscible liquid layer with the organosilicon-nitrogen product and thereafter separating same.

BACKGROUND OF THE INVENTION

This invention is related to an improved process for producing organosilicon-nitrogen compounds and the products produced thereby. More particularly this invention relates to a process for the preparation of organosilicon-nitrogen compounds, the improvement which comprises carrying out the reaction of an organohalogensilicon compound with a nitrogen base material in the presence of certain selected metals and controlling the temperature and rate of the reaction.

The general reaction of organohalosilicon compounds with nitrogen base materials is well known and may be represented by the following equation:

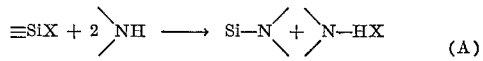
(A)

However, this basic process possesses several disadvantages. For instance, two mole equivalents of the nitrogen base are required for each silicon-nitrogen bond formed, and although a portion of the base which forms the NH—HX, halide salt by-product can be recovered, additional time, expense, equipment and process steps are necessary. In addition, low yields are obtained due to the fact that the base halide salt by-product forms a fine particulate, bulky precipitate that thickens the reaction mass, obstructs filtration and occludes much of the desired product. Moreover, said by-product salts have small but noticeable solubilities in the desired product and these soluble portions are not readily separable by filtration or centrifuging and traces of the dissolved base halide salts can often cause undesirable variations in the subsequent usage of the silicon-nitrogen product compound. Furthermore, many of these by-product salts sublime readily and cannot be cleanly separated from the desired product by fractional distillation.

Thus, while the elimination and/or suppression of this by-product base halide salt is obviously extremely desirable, it has remained a long standing problem to the art and various attempts to solve it have not been entirely satisfactory. Heretofore, attempts to accomplish this objective have only resulted in introducing other equally detrimental side reactions. For instance, it has been suggested that a diluent solvent may be added to reduce the affects of the by-product salt. However, it has been found that large amounts of solvent, often as much as fifty percent or more of the reaction volume are required to be effective. Such amounts of solvent reduce the batch yield for a given batch volume. The use of solvents is additionally undesirable in that they too must be separated at the cost of additional time, apparatus and expense.

It has also been proposed that these troublesome salt by-products may be decomposed by the addition of basic substances, such as, metal oxides, hydroxides, carbonates, bicarbonates and the like, or that the amine salt by-product may be dissolved in water or alcohol and the resultant solution separated physically from the silicon product by decantation or draining. Others have suggested that epoxides may be used to decompose the salt by-product by forming halohydrins and the free amine. However, all such methods have not been entirely successful, since they all involve the use of water, hydroxylated compounds or generate such substances in the reaction system, which readily decompose the desired silicon-nitrogen products and/or the organohalosilicon starting components.

SUMMARY OF THE INVENTION

I have now discovered that the above problems and disadvantages may be overcome by my improved process for producing organosilicon-nitrogen compounds by reacting an organohalogensilicon compound with a nitrogen base compound, the improvement which comprises carrying out the reaction in the presence of certain selected metals and controlling the temperature and rate of the reaction, as herein described below.

Therefore, it is an object of this invention to provide an efficient and economical process for preparing organosilicon-nitrogen compounds by reacting an organohalogensilicon compound with a nitrogen base compound, the improvement comprising carrying out the reaction in the presence of a selected metal and controlling the temperature and rate of the reaction. Another object is to provide a process, as above described, in which the organosilicon-nitrogen compound products may be recovered in greatly increased yields by simple decantation, draining, filtration or distillation. Still another object is to provide a process as above described which eliminates the accumulation in the reaction mass of undesirable nitrogen-base hydrohalide salt by-products and the disadvantages attendant with said by-products. Other objects and advantages will become readily apparent from the following description and appended claims.

More specifically, the instant invention may be represented by the following four concurrent reactions which take place during the preparation of the desired organosilicon-nitrogen compounds and may be depicted by the following equations:

(1) 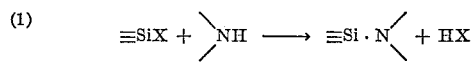

(2) 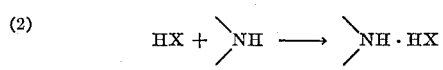

(3) 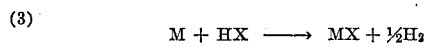

(4) 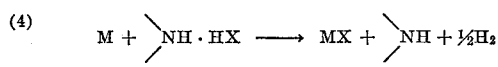

wherein ≡SiX represents an organohalogensilicon compound;

represents a nitrogen-base compound;

represents an organosilicon-nitrogen compound; HX represents a hydrogen halide;

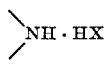

represents a nitrogen-base hydrohalide salt; M represents a selected metal; MX represents a metal halide and ½H₂ represents hydrogen gas.

DESCRIPTION OF THE PREFERRED EMBODIMENTS

Since the rate of the above reactions (1) and (2) which form the undesirable salt by-products are generally faster than the rates of the above reactions (3) and (4) which prevent or decompose any salt by-product, it is necessary to control the rate at which the organohalogensilicon compound and the nitrogen-base are brought into contact. Thus, it is an essential feature of the instant invention to limit the contact rate so that the hydrohalide salt by-product does not form faster than it can be decomposed. Accordingly, the optimum contact rate need not be calculated or measured quantitatively for successful operation of the instant invention, since the absence or accumulation of the nitrogen-base hydrohalide salt in the reaction mass is easily observed visually. In performance the contact rate may be gradually increased until salt accumulation just begins and then it can be adjusted to a slightly lower rate. For instance, the formation of the nitrogen-hydrohalide salt by-product may be visibly maintained as a slight white haze in the reaction medium. After the reaction has been completed this white haze will gradually disappear or its removal may be accelerated as discussed more fully below. It is pointed out, however, that this rate adjustment must be coupled with the employment of the instant selected metals, which cause reactions (3) and (4) so that the process is free from side reactions and in order to achieve the objectives of this invention.

The manner and order in which the reaction components are mixed is not critical so long as the selected metal is present when the halogensilicon compound and nitrogen base material are contacted. Generally it is preferred to first mix the organohalogensilicon compound and selected metal together and preheat the mixture to the desired threshold temperature and then add the nitrogen-base component. In view of the reactivity of both of the starting organohalogensilicon compounds and the organosilicon-nitrogen products toward water, alcohols and other hydroxylated substances, it is preferred that the reaction be conducted in an anhydrous and hydroxyl free environment. While solvent diluents are not needed in the instant improved process, the use of minor amounts of solvents, such as conventional hydrocarbon solvents, e.g., toluene, xylene, paraffin oil, etc., less than half of the total reaction mass, may be employed, if desired. For example, small amounts of solvent may be used to conveniently increase the solubility of a component or as a "pusher" during distillation, or to reduce product viscosity, or the like.

The instant reaction is exothermic and the reaction temperature is critical since low threshold reaction temperatures below 50° C. may lead to dangerous explosions of the reaction system. Consequently, it is a critical feature of the invention that threshold temperatures of at least 50° C. and preferably about 100° C. be used. The reaction temperature of the process may range from 50° C. to about 350° C., while it is generally preferred to conduct the reaction process at temperatures ranging from about 100° C. to about 175° C. Of course, the preferred choice of operable reaction temperature in any specific instance will depend largely upon the reactants employed, their physical properties and the like.

The metals employed by this invention are selected from the group consisting of magnesium, zinc and calcium and may be used alone or in combination with one another. These metals may be used in any free divided form, e.g., flakes, granules or powder and the like. The mole amount of metal employed may range from as little as about 80 percent of the amount that is stoichiometrically equivalent to the equivalent number of silicon-halogen bonds desired to be reacted up to a stoichiometric excess of about 30 percent or higher if desired. Generally it is preferred that the mole amount of metal employed range from about 90 percent of the amount that is stoichiometrically equivalent to the equivalent number of silicon-halogen bonds desired to be reacted up to a stoichiometric excess of about 10 percent; while about a stoichiometric equivalent is the most preferred mole amount. For example, in the reaction:

(B) $2(CH_3)_3SiCl + 2(CH_3)_2NH + Mg \rightarrow 2(CH_3)_3SiN(CH_3)_2 + MgCl_2 + H_2$ the stoichiometric amount of magnesium (atomic weight 24.32) would be 24.32 over two which equals 12.16 grams per gram-mole of trimethylchlorosilane (108.65 g.), since there is one halogen-silicon bond per molecule of trimethylchlorosilane and magnesium can react with two equivalents of chloride. It is to be understood that the amount of metal need not be present all at once but may be added gradually to the reaction. Moreover, in order to insure a highly purified product from any possible traces of solubilized nitrogen base hydrohalide salt several purification steps are available if desired. For instance, when the required amount of silicon-halogen bond has been reacted the product may be kept in contact with any excess metal for an additional length of time or a small additional amount of fresh metal may be added to the reaction mass and contact continued for a period of time. This purification step may be accelerated by recovering the product and transferring it to a vessel containing an additional small amount of fresh metal and there heated at an elevated temperature (under reflux conditions for low boiling products) until the desired purity has been achieved and thereafter recovering the silicon-nitrogen product by simple decantation, draining, filtration or distillation. These purification steps are not critical to the instant invention, however, since only a slight trace, if any amount at all, of solubilized nitrogen base hydrohalide salt is ever found to be present in the silicon-nitrogen product.

The particular organohalogensilicon compound used as a reactant in the process of this invention is not critical and merely depends on the desired silicon-nitrogen compound, i.e., a silicon compound having at least one nitrogen atom directly linked to at least one silicon atom, to be produced. Such compounds as well as methods for their production are well known in the art. Thus, any halogensilicon compound may be employed so long as it has at least one halogen atom directly linked to at least one silicon atom. Normally, a single silicon starting material is reacted, however, mixtures of such halogensilicon compounds may be employed, if desired.

Illustrative of such silicon starting materials that are useful in the present invention are halogensilanes of the formula:

(C) $R_nSiX_{4-n}$ where R represents hydrogen; a monovalent hydrocarbon or substituted hydrocarbon radical having from 1 to 18 carbon atoms; where X represents a halogen atom, e.g., chlorine, bromine, iodine or fluorine, preferably, chlorine; where $n$ is a value of from 0 to 3, inclusive. The radicals represented by R may be the same or different, and may be saturated or unsaturated, and either aliphatic or aromatic, or mixtures thereof. Likewise, when more than one X is present, the halogens may be the same or different.

As examples of siloxanes that are useful in the present invention are those composed essentially of groups having the formula:

(D)
$$R_a SiO_{\frac{4-(a+b)}{2}} X_b$$

wherein R and X are the same as defined above; $a$ has a value of from 0 to 2 inclusive; and $b$ has a value of 1 to 3, inclusive; and $a+b$ has a value of 1 to 3, inclusive.

Halogensiloxanes that are useful in the present invention also include copolymers composed of 1 to 99 mole percent of units represented by Formula D above and 1–99 mole percent of units represented by Formula E below.

(E)
$$R_c SiO_{\frac{4-c}{2}}$$

wherein R is the same as defined above and $c$ has a value of from 0 to 3, inclusive.

As examples of halogensilyl compounds useful in the present invention are those of the formula:

(F)
$$R_n \underset{|}{\overset{X_{3-n}}{Si}}{-}Y{-}\underset{|}{\overset{X_{3-n}}{Si}}R_n$$

wherein R, X and $n$ are the same as defined above; and wherein Y is a divalent bridging group selected from the group consisting of lower alkylene radicals and arylene radicals, such as phenylene, diphenylene and the like; with the proviso that at least one silicon (Si) atom is directly bonded to at least one halogen (X) atom.

As noted above, R in Formulas D, E and F may be any monovalent hydrocarbon group. Among the more specific radicals that may be mentioned are, for example, alkyl radicals, such as methyl, ethyl, propyl, butyl, isobutyl, amyl, hexyl, octadecyl and the like; alkenyl radicals, such as vinyl, allyl, butenyl, cyclopentyl, cyclohexenyl and the like; alicyclic radicals, such as cyclopentyl, cyclohexyl and the like; aryl radicals, such as phenyl, naphthyl, and the like; aralkyl radicals such as benzyl, phenylethyl and the like; and alkaryl radicals such as tolyl, xylyl, mesityl and the like. Moreover any substituent which does not effect the essential performance of the instant process may be present on said hydrocarbon radicals. Suitable illustrative substituents that may be on the hydrocarbon radicals are, for example, nitro, cyano, trifluoromethyl, secondary amino, fluorine, aryloxy, alkoxy, ketone radicals and the like.

Additional illustrative examples of specific halogen-silicon compounds that may be mentioned are, for example:

Si(Cl)$_4$
$\phi$Si(Cl)$_3$
$\phi$Si(Br)$_3$
(CH$_3$)$_2$Si(Cl)$_2$
(CH$_3$)$_2$Si(Br)$_2$
(CH$_3$)$_2$Si(I)$_2$
CH$_3$Si(Cl)$_3$
(CH$_3$)$_3$SiCl
($\phi$)$_2$Si(Cl)$_2$
(P)$_2$Si(Br)$_2$
$\phi$(CH$_3$)$_2$SiCl
(C$_2$H$_5$)$_2$Si(Br)$_2$
(C$_3$H$_7$)$_2$Si(F)$_2$
(CH$_3$)(C$_3$H$_7$)SiF$_2$
(CH$_3$)(C$_2$H$_5$)Si(Br)$_2$
($\phi$)(CH$_3$)(H)SiCl
($\phi$)(CH$_3$)Si(F)$_2$
($\phi$)(H)Si(Cl)$_2$
($\phi$)(CH$_3$)$_2$SiI
(CNC$_3$H$_6$)(CH$_3$)Si(Cl)$_2$
(C$_4$H$_9$)(CH$_3$)$_2$SiCl
(t—C$_4$H$_9$)(CH$_3$)Si(Cl)$_2$
(CH$_2$=CH)(CH$_3$)Si(Cl)$_2$
(CH$_3$OCH=CH)$_2$Si(Cl)$_2$
(CH$_2$=CH)SiCl$_3$
(CH$_3$$\phi$)(CH$_3$)$_2$SiBr
($\phi$CH$_2$)(C$_2$H$_5$)Si(Cl)$_2$
(C$_3$H$_7$)(C$_6$H$_{11}$)SiCl$_2$
(NO$_2$$\phi$)(CH$_3$)$_2$SiCl
(C$_{18}$H$_{37}$)(CH$_3$)Si(Cl)$_2$
(C$_9$H$_{19}$)(C$_2$H$_5$)$_2$SiI
(CH$_3$OC$_4$H$_8$)(CH$_3$)Si(Cl)$_2$
($\phi$OC$_2$H$_4$)$_2$(CH$_3$)SiBr
[(CH$_3$)$_2$NC$_3$H$_6$](CH$_3$)$_2$SiCl
[(C$_2$H$_5$)$_2$NC$_3$H$_6$](CH$_3$)$_2$SiCl
(CH$_3$—CF$_2$—CHF—C$_3$H$_6$)$_2$(CH$_3$)SiCl
(CH$_3$COC$_3$H$_6$)(CH$_3$)SiBr$_2$
[Cl$_3$Si]$_2$O
[(CH$_3$)$_2$ClSi]$_2$O
[(CH$_3$)$_2$BrSi]$_2$O
(CH$_3$)$_2$(Cl)SiO[(CH$_3$)$_2$SiO]Si(CH$_3$)$_2$Cl
(CH$_3$)$_2$(Cl)SiO[(CH$_3$)$_2$SiO]$_5$Si(CH$_3$)$_2$Cl
(CH$_3$)$_2$(Cl)SiO[(CH$_3$)$_2$SiO]$_{50}$Si(CH$_3$)$_2$Cl
(CH$_3$)$_2$(Cl)SiO[(CH$_3$)$_2$SiO]$_{100}$Si(CH$_3$)$_2$Cl
(CH$_3$)$_2$(Cl)Si—O—[Si(CH$_3$)$_2$O—]$_{130}$Si(CH$_3$)$_2$Cl
(CH$_2$=CH)(CH$_3$)ClSiO[(CH$_3$)$_2$SiO]Si(CH$_3$)$_2$Br
(CH$_2$=CH)(CH$_3$)(Cl)Si—O[Si(CH$_3$)$_2$O]$_{300}$Si(CH$_3$)$_2$Br
(CNC$_3$H$_6$)(CH$_3$)ClSi—O[Si(CH$_3$)$_2$O]$_3$Si(CH$_3$)$_2$Cl
(CH$_3$)$_2$(Cl)SiO[Si(CH$_3$)$_2$O]$_3$—Si(CH$_3$)$_2$Cl
(CH$_3$)$_2$(I)SiO[Si(CH$_3$)$_2$O]$_3$Si(CH$_3$)$_2$Cl
(CH$_3$)$_2$(Cl)SiO[Si(CH$_3$)$_2$O]$_6$—Si(CH$_3$)$_2$Cl
(CH$_3$)$_2$ClSiO[Si(CH$_3$)$_2$O]$_9$Si(CH$_3$)$_2$Cl
(CH$_3$)$_3$SiOSi(Cl)$_3$
(C$_2$H$_5$)$_2$CH$_3$SiOSi(CH$_3$)(Br)$_2$
(C$_3$H$_7$)$_3$SiOSiF$_3$
(CH$_3$)$_2$(Br)SiOSi(CH$_3$)$_2$Br
(CH$_3$)$_2$($\phi$)SiOSi(CH$_3$)$_2$(I)
(CH$_3$)$_3$SiOSi$\phi$(Cl)$_2$
(CH$_3$)$_2$(NO$_2$$\phi$)SiOSi(Cl)$_3$
(CH$_3$)$_2$ClSiO[Si(CH$_3$)(CH=CH$_2$)O]Si(CH$_3$)$_2$Cl
(CH$_3$)$_2$(C$_2$H$_5$)SiO[Si(CH$_3$)(CH=CH$_2$)O]$_3$SiCH$_3$(Cl)$_2$
(CH$_3$)$_2$(C$_4$H$_9$)SiOSi(CH$_3$)$_2$Cl
(CH$_3$)$_2$(Cl)SiOSi($\phi$)(CH$_3$)OSiCH$_3$)(Cl)$_2$
(CH$_3$)$_3$SiOSi(CH$_3$)(Cl)OSi(CH$_3$)$_3$
(CH$_3$)$_2$SiO[(CH$_3$)(H)SiO][(CH$_3$)$_2$SiO]$_3$Si(CH$_3$)$_2$Cl (CH$_3$)$_2$(Cl)SiOSi(CH$_3$)OSi(CH$_3$)$_2$Cl
  |
  OSi(CH$_3$)$_2$Cl (CH$_3$)$_2$(Br)$_2$SiOSi(CH$_3$)OSi(CH$_3$)$_2$Br
  |
  C$_3$H$_6$CF$_2$CH$_2$CF$_3$ (CH$_3$)$_2$(Cl)SiOSi(H)(CH$_3$)OSi(CH$_3$)$_2$Cl
[(CH$_3$)(Cl)SiO]$_4$
(Cl)$_3$SiC$_2$H$_4$Si(Cl)$_3$
(CH$_3$)$_3$SiC$_2$H$_4$Si(CH$_3$)$_2$Cl
(CH$_3$)$_3$SiC$_2$H$_4$Si(CH$_3$)$_2$Br
CH$_3$SiC$_2$H$_4$Si(CH$_3$)$_2$I
CH$_3$(Cl)$_2$SiC$_2$H$_4$Si(CH$_3$)(Cl)$_2$
(CH$_3$)(Cl)$_2$SiC$_3$H$_6$Si(CH$_3$)Cl$_2$
C$_2$H$_5$(Br)$_2$SiCH$_2$SiC$_2$H$_5$(Br)$_2$
(C$_3$H$_7$)(F)$_2$SiC$_2$H$_4$Si(C$_3$H$_7$)(F)$_2$
(CH$_3$)($\phi$)ClSiC$_4$H$_8$Si(CH$_3$)($\phi$)Cl
(CH$_3$)$_2$ClSiCH$_2$Si(Cl)(CH$_3$)$_2$
(CH$_3$)$_3$SiC$_4$H$_8$Si(CH$_3$)$_2$Br
(CH$_3$)$_3$SiC$_2$H$_4$Si(CH$_3$)(Cl)$_2$
($\phi$)$_2$ClSiC$_6$H$_4$Si($\phi$)$_2$Cl
O$_2$N$\phi$(CH$_3$)(Cl)SiC$_2$H$_4$Si(CH$_3$)(Cl)$\phi$NO$_2$
(CH$_2$=CH)$_2$(Cl)SiC$_2$H$_4$Si(CH$_3$)$_2$Cl
$\phi$(CH$_3$)$_2$SiC$_2$H$_4$Si(CH$_3$)(Br)$_2$
(C$_2$H$_5$)(CH$_3$)$_2$SiC$_2$H$_4$Si(CH$_3$)(Cl)$_2$
(C$_9$H$_{19}$)(C$_3$H$_7$)$_2$SiC$_{12}$H$_8$Si(C$_9$H$_{19}$)Cl$_2$
(CNC$_3$H$_6$)(CH$_3$)$_2$SiC$_2$H$_4$Si(Cl)(C$_3$H$_6$CN)$_2$
(C$_{18}$H$_{37}$)(CH$_3$)$_2$SiC$_3$H$_6$SiCl$_3$
$\phi$(CH$_3$)(Cl)SiC$_2$H$_4$Si(CH$_3$)($\phi$)Cl
(C$_2$H$_5$)$_2$Br—C$_2$H$_5$Si(C$_2$H$_5$)$_2$Br
(CH$_3$)$_3$SiCH$_2$Si(CH$_3$)$_2$I, and the like The symbol φ as used above and throughout this application designates a phenyl radical.

The particular nitrogen-base compound used as a reactant in the process of this invention is not critical and merely depends on the desired silicon-nitrogen compound to be produced. Such compounds as well as methods for their production are well known in the art. Thus, any nitrogen-base compound may be employed so long as it contains at least one reactive hydrogen atom directly linked to at least one nitrogen atom. Generally a single nitrogen-base compound is reacted, however, mixtures of such nitrogen-base compounds may be employed if desired. Illustrative of such nitrogen-base compounds that are useful in the present invention are those nitrogen compounds containing at least one "N—H" bond selected from the group consisting of ammonia, hydrazines, primary amines, secondary amines, heterocyclic amines, ureas, imides and the like. Said nitrogen-base compounds may contain hydrocarbon radicals of from 1 to 18 carbon atoms and may be unsubstituted or substituted with any substituent which does not affect the essential performance of the instant process, such as nitro, cyano, trifluoromethyl, secondary amino, fluorine, alkoxy, aryloxy, ketones and the like. The preferred nitrogen-base materials are those compounds containing only carbon, hydrogen, oxygen and nitrogen atoms, especially, primary and secondary amines containing from about 1 to 18 carbon atoms.

By way of illustration specific nitrogen-base materials which may be mentioned are for example: ammonia; hydrazine; methylhydrazine; ethylhydrazine; propylhydrazine; nonylhydrazine; dimethylhydrazine; trimethylhydrazine; phenylhydrazine; p-nitrophenylhydrazine; methylamine; ethylamine; propylamine; butylamine; t-butylamine; nonylamine; octadecylamine; allylamine; aniline; p-nitrophenylamine cyanopropylamine; β-vinylethylamine; gamma methoxypropylamine; dimethylamine; diethylamine; dipropylamine; diisopropylamine; dicyanopropylamine; dibutylamine; phenoxyethylamine; dimethoxypropylamine; dimethlaminodiethylamine; di-(2,3-difluorobutyl)amine; methylethylamine; ethylphenylamine; ethyl-p-nitrophenylamine; cyclohexylmethylamine; β-trifluoromethylethylamine; morpholino; piperidino; pyrrolidino; melamine; urea; methylurea; ethylurea; dimethylurea; methylethylurea oxallylurea; propyleneimine; butylimine; formamide; octamide, acetamide; propionamide; butyramide; and the like.

The mole amount of nitrogen-base material employed by the instant process need only be about stoichiometrically equivalent to the amount or number of silicon-halogen bonds desired to be reacted. Of course amounts in excess of said stoichiometric equivalent may be used if desired.

More specifically the process of this invention may be typically conducted as follows: An organohalogensilicon compound and the prescribed amount, as discussed, of the selected metal are added to a suitable reaction vessel, which is preferably maintained under anhydrous conditions and the components in the vessel heated with moderate to vigorous agitation to the appropriate temperature at least 50° C. The reaction mass is then gradually contacted with a nitrogen-base at a rate not greater than the reaction of the selected metal with hydrogen halide or nitrogen-base hydrohalide salt, while venting the by-product hydrogen gas from the vessel, and in an amount at least about stoichiometrically equivalent to the amount of silicon-halogen bonds to be reacted. When the required amount of silicon-halogen bond has been reacted, the silicon-nitrogen base may be further purified if desired as discussed above, and easily recovered by simple decantation, draining, filtration or distillation and the like.

An additional unique feature of the instant invention lies in the discovery that after the required amount of silicon-halogen bonds has been reacted the metal salt by-product solids may be easily removed by contacting the solid metal halide by-product with any additional nitrogen-base which forms a complex of said metal halide and nitrogen-base and which upon liquification results in a liquid layer that is immiscible with the desired liquid silicon-nitrogen product. Thus, said product may be easily obtained by any simple liquid phase separation method of the two immiscible layers. Generally it is preferred to maintain the temperature of the reaction medium slightly above, or higher if desired, than the melting point of the complex to be formed in order to have liquification start immediately as the contact of the metal halide and nitrogen-base is taking place. However, if desired as an alternative, the complex may be first formed as a solid and then heated to its melting point to liquify it. The amount of nitrogen-base contacted with the metal halide by-product will of course merely depend on the amount of halide present as by-product. The nitrogen-base used to form the complex may be the result of employing an excess amount of nitrogen-base during the initial reaction of the instant invention or may be added as a fresh amount and need not necessarily be the same nitrogen-base employed initially. The preferred nitrogen-base material is an alkyl amine, especially dialkyl amine, such as dimethyl amine and the like.

The following examples are illustrative of the present invention and not to be regarded as limitative. It is to be understood that all parts, percentages and proportions referred to herein and in the appended claims are by weight unless otherwise indicated.

Examples I and II demonstrate the problems encountered when nitrogen-base hydrohalide is a by-product in the amination of an organohalogensilicon compound to form an organosiliconnitrogen compound. The yield of product is completely dependent upon the number of filtrations caused by the bulky precipitated by-product.

Example I 7113 grams of $Cl[(CH_3)_2SiO]_{5.68}(CH_3)_2SiCl$, a chlorine terminated polydimethylsiloxane fluid containing 25.8 moles of chloride, were charged into a 12 liter 3 neck flask equipped with agitator, thermometer and gas bubbling tube and condenser. The flask contents were cooled to 0° C. With agitation, anhydrous dimethylamine gas (51.6 moles) was then bubbled into the reaction flask and an exotherm was noted. The flow rate of the dimethylamine was adjusted so as to keep the temperature below 10° C. After a period of one hour the reaction liquid became so thick with the solid amine hydrochloride by-product that filtration was necessary. After filtration, the filtrate was recharged to the reaction flask, where it was cooled to 0° C. and dimethylamine addition was continued. A total of five such filtrations were required before the amine hydrochloride by-product ceased to be a problem. After the fourth such filtration, the continued addition of dimethylamine to the filtrate produced only a small amount of precipitate.

At the completion of this amination reaction, enough solid amine hydrochloride was collected to completely fill 1½ gallon jars. 3628 grams of a fluid having the formula $(CH_3)_2N[(CH_3)_2SiO]_{5.68}(CH_3)_2SiN(CH_3)_2$ and a dimethyl nitrogen content of 16.4% was collected. The total yield of product from the reaction was 49.5% based upon the weight starting chloro end blocked fluid.

Example II

Following the procedure in Example I, 500 grams of the $Cl[(CH_3)_2SiO]_{5.68}(CH_3)_2SiCl$ polymer used in Example I were charged into a one liter, 3 neck flask equipped with agitator, thermometer, condenser and gas bubbling tube and the flask contents heated to 100° C. With agitation, anhydrous dimethylamine gas was bubbled into the reactor and an exotherm of 2° C. was noted. After the addition of approximately 0.7 mole of dimethylamine, the reaction mass became thick and agitation was impossible. The mass was filtered to remove the solid hydrohalide by-product and the partially aminated product was recharged to the reactor. This procedure was repeated three times before the theoretical amount of dimethylamine (3.64 moles or 164 grams) was completely added to the reaction vessel. After the fourth and last filtration, 292 grams of product $$(CH_3)_2N[(CH_3)_2SiO]_{5.68}(CH_3)_2SiN(CH_3)_2$$

were recovered for a yield of only 51.5% based on the weight of the starting chlorosiloxane. In addition, two one quart bottles were filled completely with the amine hydrochloride by-product.

The following examples demonstrate the process of the instant invention and illustrate the high yields of organosiliconnitrogen compounds obtained due to the elimination of the undesirable nitrogen-base hydrohalide salt by-product and the problems attendant therewith.

Example III 5021 grams of $Cl[(CH_3)_2SiO]_{4.01}(CH_3)_2SiCl$, a chlorine terminated polydimethylsiloxane fluid containing about 23.6 moles of chloride, were charged into a 12 liter 3 neck flask equipped with an agitator, thermometer, condenser and gas bubbling tube along with 300 grams (12.7 moles) of magnesium turnings. The mixture of chlorosiloxane fluid and magnesium was agitated and heated to 100° C. 100 grams of anhydrous dimethylamine gas (24.5 moles) were then bubbled into the reaction media and an exotherm resulted. The flow rate of dimethylamine was adjusted and the formation of the amine hydrochloride by-product visibly maintained as a slight white haze in the reaction medium so as to maintain a slow temperature increase. Under these conditions, the mass temperature increase to about 113° C. over a period of 1½ hours. After three additional hours, the mass temperature dropped to 71° C., signifying the completion of the reaction. The trace of amine hydrochloride appearing as a white haze was completely removed by heating the reaction mass to 100° C. for a period of two hours.

Upon cooling, solid crystals of $MgCl_2$ having dimensions of between ⅛ and ¼ inch settled to the bottom of the reactor and 4785 grams of product having the formula $(CH_3)_2N[(CH_3)_2SiO]_{4.01}(CH_3)_2SiN(CH_3)_2$ and a 19.8% dimethyl nitrogen content were recovered by filtration. Owing to the rapid settling of the solid magnesium chloride by-product the siloxamine could have also easily been recovered by decantation. Approximately one quart of $MgCl_2$ solids were obtained while the yield of desired siloxamine product was 84% based upon the weight of the starting chloro end blocked fluid.

Example IV 500 grams of a $Cl[(CH_3)_2SiO]_{4.01}(CH_3)_2SiCl$ polymer having 2.35 moles of chloride were charged into a one liter 3 neck flask equipped with a bottom drain and fitted with an agitator, thermometer, condenser and gas bubbling tube. 28.7 grams (1.18 moles) of magnesium metal turnings were also added to the flask and the mass heated to 100° C. With agitation 106 grams of anhydrous dimethylamine gas were bubbled into the reaction mass at an adjusted flow rate so as to maintain a slow temperature increase and visibly maintain the formation of amine hydrochloride by-product as a slight white haze. After one hour, the reaction temperature reached its maximum of 135° C., and then began to decline and the white haze disappeared. The reaction mass consisted of desired siloxamine product and visible solid yellowish $MgCl_2$ by-product. The temperature was maintained above 100° C. and additional dimethylamine was added (about 150 grams) until the solid by-product liquified forming an immiscible layer with the desired clear liquid siloxamine product when agitation was discontinued. This by-product layer (the bottom layer) was separated at 120° C. by opening the bottom drain of the reaction flask and allowing it to drain off. After the reaction flask was cooled to room temperature, 502 grams of siloxamine $$(CH_3)_2N[(CH_3)_2SiO]_{4.01}(CH_3)_2SiN(CH_3)_2$$

having a dimethyl nitrogen content of 19.7 weight percent were recovered. The yield of this desired siloxamine was 90.3% based on the weight of the starting chlorosiloxane.

Similar results may be obtained by following the above procedure and employing zinc or calcium as the metal instead of magnesium.

Example V 220 grams (1.29 moles) of phenyldimethylchlorosilane ($\phi(CH_3)_2SiCl$) were charged into a 500 cc. 3 neck liter flask, equipped with an agitator, thermometer, gas bubbling tube and condenser, along with 18.9 grams (0.82 mole) of magnesium metal turnings. The reactants were agitated and heated to 80° C. 60.8 grams (1.35 moles) of anhydrous dimethylamine gas were bubbled into the flask at a rate which caused an exotherm of 29° C. over a 5 minute period and the formation of the amine hydrochloride by-product visibly maintained as a slight white haze in the reaction medium. The reaction was completed in about a half an hour and the reactants cooled to room temperature and filtered to remove the $MgCl_2$ crystals. Upon distillation of the filtrate, 212 grams of phenyldimethylaminedimethylsilane $[\phi(CH_3)_2SiN(CH_3)_2]$ which boiled at 53° C. (2.3 mm. Hg) were recovered. The yield of said silylamine based on the weight of $\phi(CH_3)_2SiCl$ starting material was 92%.

Analysis revealed the following: N=7.8%; C=65.2%; H=9.6%; Si=16.0%; chlorine-undetectable. Theory: N=7.8%; C=67.0%; H=9.5%; Si=15.7%. Infrared analysis substantiated the structural formula $$\phi\underset{\underset{CH_3}{|}}{\overset{\overset{CH_3}{|}}{Si}}-N(CH_3)_2$$

Example VI

A 500 cc. 3 neck flask was equipped with an agitator, condenser, thermometer and gas bubbling tube. 170 grams (0.573 mole) of bis-trichlorosilylethane $$(Cl)_3SiC_2H_4Si(Cl)_3$$

were charged into the flask along with 52 grams (2.13 moles) of magnesium metal powder and the reactants agitated and heated to 100° C. about 169 grams of anhydrous dimethylamine gas (3.76 moles) were bubbled into the flask and an exotherm resulted. The flow rate of amine was adjusted so that the formation of the amine hydrochloride by-product was visibly maintained as a slight white haze in the reaction medium. After a period of about 80 minutes the reaction temperature had increased to 158° C. The reaction was maintained for an additional 3½ hours at which time the pot temperature had decreased to about 36° C. The agitation was terminated and the crystals of $MgCl_2$ allowed to settle to the bottom of the reaction vessel whereby the solids were removed by filtration and the silylamine product distilled from the resulting liquid filtrate. The yield of desired product $[((CH_3)_2N)_3SiCH_2]_2$ amounted to 162 grams for a total yield of 81.5% based on the weight of the chlorosilicon starting material.

Example VII

As in Example IV, 54 grams (0.34 mole) of vinyltrichlorosilane ($CH_2=CH-Si-Cl_3$) and 14 grams of magnesium metal turnings were added to the reaction flask. The reactants were heated with agitation to 60° C. and 105 grams of diisopropylamine (1.04 moles) were added to the flask and an exotherm of 25° C. was noted. The flow rate of amine was adjusted so that the formation of amine hydrochloride was maintained as a slight white haze in the reaction medium. After the reaction was completed the reactants were heated to 125° C. for an additional 90 minutes. Upon cooling and separation of the product by filtration, 80 grams of $$CH_2=CHSi[N(C_3H_7)_2]_3$$

were collected by distillation. This amount of product represents a 67% yield based on the weight of the starting chlorosilane precursor.

Example VIII

A 500 cc. 3 neck flask was equipped with an agitator, thermometer, condenser and gas bubbling tube. To this flask, 129 grams of dimethyldichlorosilane (1 mole) and 40.1 grams of calcium metal flakes (1 mole) were added. The mixture was heated with agitation to 50° C. 95 grams of anhydrous dimethylamine gas (2.1 moles) were slowly bubbled into the flask, so as to maintain the formation of amine hydrochloride by-product as a slight white haze. Over a period of about three hours, the time required for the addition of all of the amine, the temperature increased to 61° C. and then began to subside followed by disappearance of the white haze. Upon cooling to room temperature, the by-product crystals of calcium chloride were removed by filtration. On distillation, 132 grams of silylamine, $(CH_3)_2Si[N(CH_3)_2]_2$, having a boiling point of 128° C. were recovered. The yield of desired silylamine amounted to 90.5% based on the weight of the starting $(CH_3)_2SiCl_2$ silane.

Example IX

A 1,000 cc. 3 neck flask was equipped with an agitator, thermometer, condenser and gas bubbling tube. To this flask, 108.5 grams (1 mole) of trimethylchlorosilane, 400 grams of xylene and 12.2 grams of magnesium metal powder (0.5 mole) were added. The flask and contents were heated with agitation to 65° C. 48 grams of anhydrous dimethylamine gas (1.07 moles) were slowly bubbled into the flask so as to maintain the temperature below 70° C. and visibly maintain the formation of amine hydrochloride by-product as a slight white haze. After approximately three hours the reaction was complete and the reactants allowed to cool to room temperature while the white haze disappeared. The solid $MgCl_2$ by-product was filtered from the flask and the filtrate distilled. 94 grams of silylamine, $(CH_3)_3SiN(CH_3)_2$, having a boiling point of 82° C., were obtained. The yield of desired silylamine was 80.5% based on the weight of the starting $(CH_3)_3SiCl$ silane.

Example X

Following the procedure described above other organosilicon-nitrogen compounds may be prepared depending merely upon the choice of the reactants employed as shown by the following illustrative table.

The organosilicon-nitrogen compounds prepared by the process of this invention have uses well known and understood in the art of organosilicon chemistry. For example, they may be used alone or in conjunction with other materials to treat paper, textiles, fabrics, leather, etc.; to impart water-repellancy and help reduce shrinkage characteristics. Likewise, they may also be used to waterproof metals, i.e., steel, glass and ceramics. They may be used as resins or resin forming intermediates as well as employed as processing aids for polysiloxanes elastomers. They may also be used as additives for lubricants and adhesives or used to assist in binding siliceous fibers and to impart dimensionable stability to said fibers. They may further be reacted with a host of other compounds to produce new chemical derivatives having a wide variety of uses.

Various modifications and variations of this invention will be obvious to a worker skilled in the art and it is

TABLE I

| No. | Silicon | Nitrogen-Base | Metal | Product |
|---|---|---|---|---|
| (1) | $SiCl_4$ | $Me_2NH$ | Mg | $Si[NMe_2]_4$ |
| (2) | $Me_3SiCl$ | $MeCONH_2$ | Mg | $Me_3SiNHCOMe$ |
| (3) | $\phi SiBr_3$ |  HN(CH₂/CH—Me) | Mg | $\phi Si[N(CH_2/CH-Me)]_3$ |
| (4) | $(\phi_2)(H)SiCl$ | $Me_2NH$ | Mg | $(\phi_2)(H)SiNMe_2$ |
| (5) | $C_6H_{11}SiCl_3$ | $Et_2NH$ | Mg | $C_6H_{11}Si[NEt_2]_3$ |
| (6) | $Me_2SiCl_2$ | $(C_3H_6)_2NH$ | Ca | $Me_2ClSiN(C_3H_6)_2$ |
| (7) | $Et_3SiCl$ | $NH_3$ | Mg+Ca | $Et_3SiNH_2$ |
| (8) | $\phi_2SiF_2$ | $CF_3C_2H_4NH_2$ | Mg | $\phi_2FSiNHC_2H_4CF_3$ |
| (9) | $(Me\phi)_2SiCl_2$ | $(iso-C_3H_7)_2NH$ | Mg | $(Me\phi)_2Si[N-(C_3H_7)_2]_2$ |
| (10) | $C_5H_{11}SiCl_3$ | $(C_4H_9)_2NH$ | Mg | $C_5H_{11}Si[N(C_4H_9)_2]_3$ |
| (11) | $(CF_3CF_2C_3H_6)_2SiCl_2$ | $(CH_3CF_2CF_2CH_2)_2NH$ | Mg+Ca | $(CF_3CF_2C_3H_6)_2Si[N(CH_2CF_2CF_2CH_3)_2]_2$ |
| (12) | $Me_3SiI$ | $NH_2CONH_2$ | Zn | $Me_3SiNHCONH_2$ |
| (13) | $Et_3SiBr$ | $NH_2CONHEt$ | Zn | $Et_3SiNHCONHEt$ |
| (14) | $(Me)(Et)SiBr_2$ | $(C_6H_{11})(Me)NH$ | Zn | $(Me)(Et)Si[N(Me)(C_6H_{11})]_2$ |
| (15) | $(C_4H_9)_3SiI$ | $C_9H_{19}NH_2$ | Zn | $(C_4H_9)_3SiNHC_9H_{19}$ |
| (16) | $(Me_2)(CNC_3H_6)SiCl$ | $CNC_3H_6NH_2$ | Ca | $(Me_2)(CNC_3H_6)SiNHC_3H_6CN$ |
| (17) | $(Vi)(Me_2)SiCl$ | $C_3H_7CONH_2$ | Mg | $(Vi)(Me_2)SiNHCOC_3H_7$ |
| (18) | $(\phi CH_2)(Et)SiCl_2$ | $\phi NH_2$ | Mg | $(\phi CH_2)(Et)Si[NH\phi]_2$ |
| (19) | $(NO_2\phi)(Me_2)SiCl$ | $NO_2\phi NH_2$ | Ca | $(NO_2\phi)(Me_2)SiNH\phi NO_2$ |
| (20) | $(MeOC_4H_8)_2(Me)SiCl$ | $MeOC_3H_6NH_2$ | Mg | $(MeOC_4H_8)_2(Me)SiNHC_3H_6OMe$ |
| (21) | $(C_{18}H_{37})(Me)SiCl_2$ | $C_9H_{19}NH_2$ | Mg | $(C_{18}H_{37})(Me)Si[NHC_9H_{19}]_2$ |
| (22) | $[Me_2NC_3H_6](Me_2)SiCl$ | $Me_2NH$ | Mg | $[Me_2NC_3H_6](Me_2)SiNMe_2$ |
| (23) | $(MeCOC_3H_6)(Me)SiBr_2$ | $Et_2NH$ | Mg | $(MeCOC_3H_6)(Me)Si[NEt_2]_2$ |
| (24) | $(CH_3CF_2CHFC_3H_6)_2(Me)SiCl_2$ | $(Me)(Et)NH$ | Mg | $(CH_3CF_2CHFC_3H_6)_2(Me)SiN(Me)(Et)$ |
| (25) | $[(Me_2)(Cl)SiO]_2$ | HN(CH₂CH₂/CH₂CH₂)CH₂ | Mg | $[(Me_2)(C_5H_{10}N)SiO]_2$ |
| (26) | $Me_2ClSiO[Me_2SiO]SiMe_2Cl$ | $Me_2NH$ | Mg | $Me_2(Me_2N)SiO[Me_2SiO]SiMe_2(NMe_2)$ |
| (27) | $Me_2ClSiO[Me_2SiO]_5SiMe_2Cl$ | $Me_2NH$ | Mg | $Me_2(Me_2N)SiO[Me_2SiO]_5SiMe_2(NMe_2)$ |
| (28) | $Me_2ClSiO[Me_2SiO]_{50}SiMe_2Cl$ | $(C_3H_7)_2NH$ | Mg | $Me_2[(C_3H_7)_2N]SiO[Me_2SiO]_{50}SiMe_2[N(C_3H_7)_2]$ |
| (29) | $Me_2BrSiO[Me_2SiO]_{130}SiMe_2Br$ | $Et_2NH$ | Ca | $Me_2Et_2N]SiO[Me_2SiO]_{130}SiMe_2[NEt_2]$ |
| (30) | $(Vi)(Me)ClSiO[Me_2SiO]_{300}SiMe_2Br$ | $Me_2NH$ | Mg | $(Vi)(Me)(Me_2N)SiO[Me_2SiO]_{300}SiMe_2[NMe_2]$ |
| (31) | $(CNC_3H_6)(Me)ClSiO[Me_2SiO]SiMe_2Cl$ | $Me_2NH$ | Mg | $(CNC_3H_6)(Me)(Me_2N)SiO[Me_2SiO]SiMe_2(NMe_2)$ |
| (32) | $Me_3SiO[(Me)ClSiO]SiMe_3$ | $Et_2NH$ | Mg | $Me_3SiO[(Me)(EtN)SiO]SiMe_3$ |
| (33) | $Me_3SiOSiCl_3$ | $Me_2NH$ | Mg | $Me_3SiOSi[NMe_2]_3$ |
| (34) | $(C_3H_7)_3SiOSiMe_2F$ | $MeNH_2$ | Ca | $(C_3H_7)_3SiOSiMe_2NHMe$ |
| (35) | $Me_2ClSiO[(Me)(Vi)SiO]SiMe_2Cl$ | $Me_2NH$ | Ca | $Me_2[Me_2N]SiO[(Me)(Vi)SiO]SiMe_2[NMe_2]$ |
| (36) | $[(Me)ClSiO]_4$ | $CH_2=CHCH_2NH_2$ | Mg | $[(Me)(CH_2=CHCH_2NH)SiO]_4$ |
| (37) | $Me_3SiC_2H_4SiMe_2Br$ | $MeNHCONHMe$ | Mg | $Me_3SiC_2H_4SiMe_2NMeCONHMe$ |
| (38) | $Me_3SiC_6H_4SiMe_2Cl$ | $\phi OC_2H_4NH_2$ | Ca | $Me_3SiC_6H_4SiMe_2NHC_2H_4O\phi$ |
| (39) | $Me_3SiCH_2SiMe_2I$ | $NH_2NH_2$ | Zn | $Me_3SiCH_2SiMe_2NHNH_2$ |
| (40) | $Me_3SiC_4H_8SiMe_2Cl$ | $MeNHNHMe$ | Ca | $Me_3SiC_4H_8SiMe_2NMeNHMe$ |
| (41) | $(Vi)_2ClSiC_2H_4SiMe_2Cl$ | $EtNH_2$ | Mg | $(Vi)_2(EtNH)SiC_2H_4SiMe_2(NHEt)$ |

In the above table the symbol Me designates a methyl radical; Et designates an ethyl radical; Vi designates a vinyl ($CH_2=CH$) radical and $\phi$ designates a phenyl radical.

understood that such modifications and variations are to be included within the purview of this application and the spirit and scope of the appended claims.

What is claimed is:

1. In a process for preparing organosilicon-nitrogen compounds by reacting an organohalogensilicon compound with a nitrogen-base compound, the improvement which comprises contacting an organohalogensilicon compound having at least one halogen atom directly bonded to a silicon atom with a nitrogen-base compound having at least one hydrogen atom directly bonded to a nitrogen atom at a temperature of at least 50° C. in the presence of a metal selected from the group consisting of magnesium, calcium and zinc, at a contact rate not greater than the reaction of the metal with the hydrogen halide and nitrogen-base hydrohalide salt by-products, wherein the mole amount of metal present ranges from about 80 percent of the amount that is stoichiometrically equivalent to the equivalent number of silicon-halogen bonds to be reacted to a stoichiometric excess of about 30 percent, and wherein the amount of nitrogen-base compound employed is at least about stoichiometrically equivalent to the number of silicon-halogen bonds to be reacted to produce a organosilicon-nitrogen compound having a least one nitrogen atom directly bonded to at least one silicon atom.

2. A process as defined in claim 1, wherein the reaction temperature ranges from at least 50° C. to about 350° C. and wherein the mole amount of metal present ranges from about 90 percent of the amount that is stoichiometrically equivalent to the equivalent number of silicon-halogen bonds to be reacted to a stoichiometric excess of about 10 percent.

3. A process as defined in claim 1, wherein the reaction is carried out in the presence of a solvent.

4. A process as defined in claim 1, wherein the reaction is carried out under anhydrous conditions.

5. A process as defined in claim 1, wherein the organohalogensilicon compound is selected from the group consisting of silanes, siloxanes and silyl compounds.

6. A process as defined in claim 1, wherein the nitrogen-base compound is selected from the group consisting of ammonia, hydrazines, primary amines, secondary amines, heterocyclic amines, ureas, imides and amides.

7. A process as defined in claim 1, wherein the formed organosilicon-nitrogen compound and solid metal halide by-product mixture is separated by contacting said metal halide with a sufficient amount of nitrogen-base compound to form a complex of metal halide and nitrogen-base and liquifying said complex which results in an immiscible liquid layer with the liquid silicon-nitrogen product, and thereafter separating same.

8. A process as defined in claim 7, wherein the nitrogen-base compound is a dialkylamine.

9. A process as defined in claim 8 wherein the dialkylamine is dimethylamine.

10. A process as defined in claim 4, wherein the organohalogensilicon compound is selected from the group consisting of silanes, siloxanes and silyl compounds; wherein the nitrogen-base compound is selected from the group consisting of ammonia, hydrazines, primary amines, secondary amines, heterocyclic amines, ureas, imides and amides; wherein the reaction temperature ranges from about 100° C. to about 175° C.; wherein the mole amount of metal present is that amount which is about stoichiometrically equivalent to the equivalent number of silicon-halogen bonds to be reacted and wherein the mole amount of nitrogen-base compound employed is about stoichiometrically equivalent to the number of silicon-halogen bonds to be reacted.

11. A process as defined in claim 10, wherein the organohalogensilicon compound is selected from the group consisting of (A) halogensilanes of the formula:

(A) $R_nSiX_{4-n}$ wherein R represents a member selected from the group consisting of hydrogen and a monovalent hydrocarbon or substituted hydrocarbon radical having from 1 to 18 carbon atoms, wherein $n$ has a value of from 0 to 3, inclusive, and X represents a halogen atom; (B) halogensiloxanes of the formula (B)
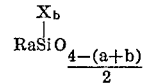

wherein R and X are the same as defined above, wherein $a$ has a value of from 0 to 2, inclusive, and $b$ has a value of 1 to 3, inclusive, and $a+b$ has a value of 1 to 3, inclusive; (C) halogensiloxane copolymers composed of 1 to 99 mole percent of units represented by (B) above and 1 to 99 mole percent of units represented by the formula (C)

wherein R is the same as defined above and $c$ has a value of from 0 to 3, inclusive; and (D) halogensilyl compounds of the formula (D)
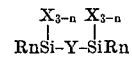

wherein R, X and $n$ are the same as defined above and wherein Y represents a divalent bridging group selected from the group consisting of lower alkylene radicals and arylene radicals.

12. A process as defined in claim 11, wherein the formed organosilicon-nitrogen compound and solid metal halide by-product mixture is separated by contacting said metal halide with a sufficient amount of nitrogen-base compound to form a complex of metal halide and nitrogen-base and liquifying said complex which results in an immiscible liquid layer with the liquid silicon-nitrogen product, and thereafter separating same.

13. A process as defined in claim 12, wherein R is a monovalent hydrocarbon radical and X is chlorine.

14. A process as defined in claim 13, wherein the nitrogen-base compound is a dialkylamine.

15. A process as defined in claim 14, wherein the dialkylamine is dimethylamine.

16. A process as defined in claim 13, wherein the metal is magnesium.

17. A process as defined in claim 13, wherein the metal is calcium.

18. A process as defined in claim 13, wherein the metal is zinc.

References Cited

UNITED STATES PATENTS

| 2,503,919 | 4/1950 | Patnode. |
| 2,564,674 | 8/1951 | Cheronis. |
| 2,579,416 | 12/1951 | Cheronis. |
| 2,579,417 | 12/1951 | Cheronis. |
| 2,579,418 | 12/1951 | Cheronis. |
| 2,865,885 | 12/1958 | De Benneville et al. |
| 2,865,918 | 12/1958 | Hurwitz et al. |
| 3,007,886 | 11/1961 | Parker _____ 260—448.2 XR |
| 3,143,514 | 8/1964 | Boyer _____ 260—448.2 XR |

TOBIAS E. LEVOW, Primary Examiner

J. P. PODGORSKI, Assistant Examiner

U.S. Cl. X.R.

260—46.5, 239, 247, 293, 326.8